United States Patent [19]
Van Der Tol et al.

[11] Patent Number: 5,761,353
[45] Date of Patent: Jun. 2, 1998

[54] OPTICAL COUPLING DEVICE AND OPTICAL SWITCH FOR USE IN THE COUPLING DEVICE

[75] Inventors: Johannes Jacobus Gerardus Maria Van Der Tol, Zoetermeer; Mattijs Oskar Van Deventer, Leidschendam, both of Netherlands

[73] Assignee: Koninklijke PTT Nederland N.V., Groningen, Netherlands

[21] Appl. No.: 755,297

[22] Filed: Nov. 22, 1996

[30] Foreign Application Priority Data

Dec. 7, 1995 [NL] Netherlands ............... 1001841

[51] Int. Cl.$^6$ ................................. G02B 6/26
[52] U.S. Cl. ............. 385/16; 385/14; 385/129; 385/9; 385/45; 385/21
[58] Field of Search ................. 385/8, 9, 16, 17, 385/18, 20, 21, 24, 14, 45, 129

[56] References Cited

U.S. PATENT DOCUMENTS

| | | | |
|---|---|---|---|
| 4,932,735 | 6/1990 | Koai | 385/17 |
| 5,640,471 | 6/1997 | Khan et al. | 385/17 |

FOREIGN PATENT DOCUMENTS

| | | |
|---|---|---|
| 2 429 445 | 1/1980 | France . |
| WO 86/01907 | 3/1986 | WIPO . |
| WO 88/07220 | 9/1988 | WIPO . |

OTHER PUBLICATIONS

F. R. El–Akkari et al., "Electrooptical Channel Waveguide Matrix Switch Using Total Internal Reflection", Topical Meeting on Integrated and Guided Wave Optics, 1980, Paper TuE4/1–4, published by IEEE, New York.

W. Burns et al; "Mode Conversion in Planar–Dielectric Separating Waveguides"; 1975; pp. 32–39; IEEE Journal of Quantum Electronics, vol. QE–11, No. 1; Jan. 1975.

T. Wu et al; "A Novel Passive Protected SONET Bi–Directional Self–Healing Ring Architecture"; 1991; pp. 0894–0900; IEEE.

T. Wu; "Fiber Network Service Survivability"; 1992; pp. 162–173; Artech House, Boston 1992.

*Primary Examiner*—John Ngo
*Attorney, Agent, or Firm*—Frishauf, Holtz, Goodman, Langer & Chick

[57] ABSTRACT

An optical coupling device for a node in a self-healing optical network, wherein the number of switching elements is reduced by using a novel type of optical 2×2-switch. The switch has two switching states: (i) a bar state (ss1) in which a first and a second main port are optically coupled through to a first and a second secondary port, respectively; and (ii) a half-cross state (ss2) in which the main ports are coupled through to one another and in which the secondary ports are not involved in any through-coupling. An integrated design of the switch is based on two asymmetric Y-junctions coupled to one another via a common side branch in which electrodes are active in order to vary the propagation constant. Accordingly, a compact, integrated version of the optical coupling device with only two switching elements can be achieved.

18 Claims, 8 Drawing Sheets

OPTICAL COUPLING DEVICE AND OPTICAL SWITCH FOR USE IN THE COUPLING DEVICE

BACKGROUND OF THE INVENTION

Field of the Invention

The invention is in the field of optical coupling devices, for example for the coupling of optical links in optical networks. In particular, the invention relates to an optical coupling device provided with six connection points, numbered from one to six inclusive, each for connecting an optical link, and with switching means for implementing optical through-couplings between the six connection points; wherein the switching means comprising three switching states, a first switching state in which through-couplings exist between the first and the fourth connection point, between the second and the fifth connection point and between the third and the sixth connection point, a second switching state in which through-couplings exist between the first and the fifth connection point and between the third and the sixth connection point, and a third switching state in which through-couplings exist between the first and the fourth connection point and between the second and the sixth connection point.

The switching means comprises two switches, a first switch and a second switch, which are provided with a main port, a secondary port and another port. The main port and the secondary port of the first switch are respectively coupled to the first and the fourth connection point, and the main port and the secondary port of the second switch are respectively coupled to the sixth and the third connection point.

Such a coupling device is known, for example from References 1 and 2 (which are defined below under the heading References). The coupling device disclosed in References 1 and 2 is used as (a component of) an optical switching system in a self-healing optical network having a ring structure, a so-called "self-healing ring" network. The network described in Reference 1, with reference to FIG. 2 and FIGS. 3 (a), (b) and (c) thereof (see also corresponding figures FIG. 4.20 (a), (b) and (c) in Reference 2), is a bidirectional network which comprises two or more nodes which are linked to one another in a ring structure. The ring structure, for each of the two signal transport directions, comprises two physically separate rings, a working ring and a protection ring, formed by two separate optical fibres. Signals to be transmitted are put on the working ring for the desired signal transport direction by one node and are taken off or tapped off the working ring in question by another node. For the purpose of putting signals on the ring and taking them off, each node is provided with a network element known as an add/drop-multiplexer (ADM). Each node is further provided with the said optical switching system. If a portion of the network becomes defective, for example in the event of a cable break between two successive nodes in the ring structure, or if (an ADM in) a node fails, the signals, with the aid of the optical switching system, are directed, for each signal transport direction, not via the working ring but via the protection ring, in the opposite direction, so that it is thus possible to keep all the other, non-defective nodes accessible for transmission via the ring structure. This known optical switching system comprises, for each of the two signal transport directions, an optical coupling device of the abovementioned type. This coupling device comprises a switching circuit (said switching means) consisting of three switches, viz. the said first and second switch, which are 1×2-switches (switches OP_B and OP_A in FIG. 3), and a third switch, which is a 2×2-switch (switch OP_C). The third switch is a cross/bar switch having two input ports (A and B) and two output ports (AA and BB), one of the input ports (A) being coupled to the other port (a second secondary port (BB)) of the first switch, and one of the output ports (AA) to the other port (a second secondary port B) of the second switch, whereas the other input port (B) and the other output port (BB) are coupled, respectively, to the second and the fifth connection point. An output and an input of the ADM are connected, respectively, to the first and the sixth connection point. The incoming and the outgoing end of the working ring are connected, respectively, to the third and the fourth connection point, whereas the incoming and the outgoing end of the protection ring are connected, respectively, to the second and the fifth connection point. A drawback of this known coupling device is that a switch-over from a signal being carried via the working ring to a signal being carried via the protection ring always requires two switches to be actuated separately. Since three separately actuable switches result in eight different possible switching states, of which only three are used, however, this known coupling device and the actuation of the switching means incorporated therein are unnecessarily complicated. This applies even more forcefully to an integrated form of the coupling device.

SUMMARY OF THE INVENTION

A first object of the invention is to provide an optical coupling device of the abovementioned type, which does not have said drawback of the prior art. The invention is based on the finding that the use of a novel type of optical 2×2-switch, which hereinafter will sometimes be referred to as a half-cross/bar switch, makes it possible to achieve the three required switching states by means of a combination of two of such switches. The half-cross/bar switch has two main ports and two secondary ports and has two switching states, a parallel state or bar state, in which the two main ports are optically coupled through to different secondary ports, and a half-cross state in which only the two main ports are coupled through to one another, and the two secondary ports are not involved in any through-coupling.

According to a first aspect of the invention, an optical coupling device of the abovementioned type is provided, wherein the other port is another main port and in that the two switches are further provided with another secondary port, in that each of the two switches has two switching substates, a first switching substate in which the main port and the other main port are coupled through to, respectively, the secondary port and the other secondary port, and a second switching substate in which the main port is coupled through to the other main port and the secondary port and the other secondary port are not involved in through-coupling, the first switching state corresponding to the first switching substate of the first and the second switch, the second switching state corresponding to the second switching substate of the first switch and the first switching substate of the second switch, and the third switching state corresponding to the first switching substate of the first switch and the second switching substate of the second switch.

The switching means of such an optical coupling device further have a fourth switching state in which, in an application as described in Reference 1, an ADM connected to the first and the sixth connection point, for example for testing purposes, can be completely uncoupled from a working ring connected to the third and the fourth connection point. Depending on the sequential order in which the two half-cross/bar switches are positioned, with respect to one another, in the coupling device, there are two possibilities. Preferred embodiments imply these two possibilities.

According to a second aspect of the invention, a coupling device is provided, having the same function as the above-mentioned type coupling device, each for connecting an optical link, and having switching means for implementing optical through-couplings between the six connection points, and having an integrated form as follows. The switching means comprise a substrate and, formed thereon, two optical switches which each include:

an input section provided with a first optical input guide and a second optical input guide, an output section provided with a first optical output guide and a second optical output guide, and an optical switching section provided with a first asymmetric Y junction provided with a first optical wave-guiding trunk and a first and a second optical wave-guiding branch, the trunk and the first branch of the first Y-junction being coupled, respectively, to the first input guide and the first output guide, a second asymmetric Y-junction provided with an optical wave-guiding trunk and a first and a second optical wave-guiding branch, the trunk and the first branch of said second Y-junction respectively being coupled to the second output guide and the second input guide, and the second branch being coupled to the second branch of the first Y-junction, and with means for varying the optical propagation state in the two branches, coupled to one another, of the two Y-junctions, the first input guide and the first output guide of the first switch being coupled, respectively, to the first and the fourth connection point, and the second input guide and the second output guide of the second switch being coupled, respectively, to the third and the sixth connection point.

Another object of the invention is to provide an integrated optical design of said half-cross/bar switch. To this end, according to a third aspect of the invention, an integrated optical switch comprises:

an input section provided with a first optical input guide and a second optical input guide, an output section provided with a first optical output guide and a second optical output guide, and an optical switching section provided with a first asymmetric Y junction provided with a first optical wave-guiding trunk and a first and a second optical wave-guiding branch, the trunk and the first branch of the first Y-junction being coupled, respectively, to the first input guide and the first output guide, a second asymmetric Y-junction provided with an optical wave-guiding trunk and a first and a second optical wave-guiding branch, the trunk and the first branch of said second Y-junction respectively being coupled to the second output guide and the second input guide, and the second branch being coupled to the second branch of the first Y-junction, and means for varying the optical propagation state in the two branches, coupled to one another, of the two Y-junctions.

REFERENCES

Reference 1 T.-H. Wu and W Way, "A novel passive protected SONET bidirectional self-healing ring architecture", MILCOM '91, Vol. 3, pp. 0894–0900;

Reference 2 T.-H. Wu, "fiber network service survivability", Artech House, Boston, 1992, in particular Sect. 4.4.1. "Passive protected bidirectional self-healing ring architecture (BSHR4/PPR)", pp. 162–167;

Reference 3 WO-88/07220-A;

Reference 4 W. K. Burns and A. F. Milton, "Mode conversion in planar-dielectric separating waveguides", IEEE J. Quant. Electron., Vol. QE-11, No. 1, January 1975, pp 32–39.

Reference 3 discloses a digital optical switch based on an asymmetric Y-junction and a switchable symmetrical Y-junction, the Y-junctions being coupled by means of their trunks. Such a digital optical switch is a 2×2 switch of the cross/bar type, which is not suitable for implementing the optical coupling device of the present invention.

References 1–4 are incorporated herein by reference.

BRIEF DESCRIPTION OF THE DRAWING

The invention will be explained in more detail by means of a description of illustrative embodiments, reference being made to a drawing which comprises the following figures.

DESCRIPTION OF ILLUSTRATIVE EMBODIMENTS

Figure 1:
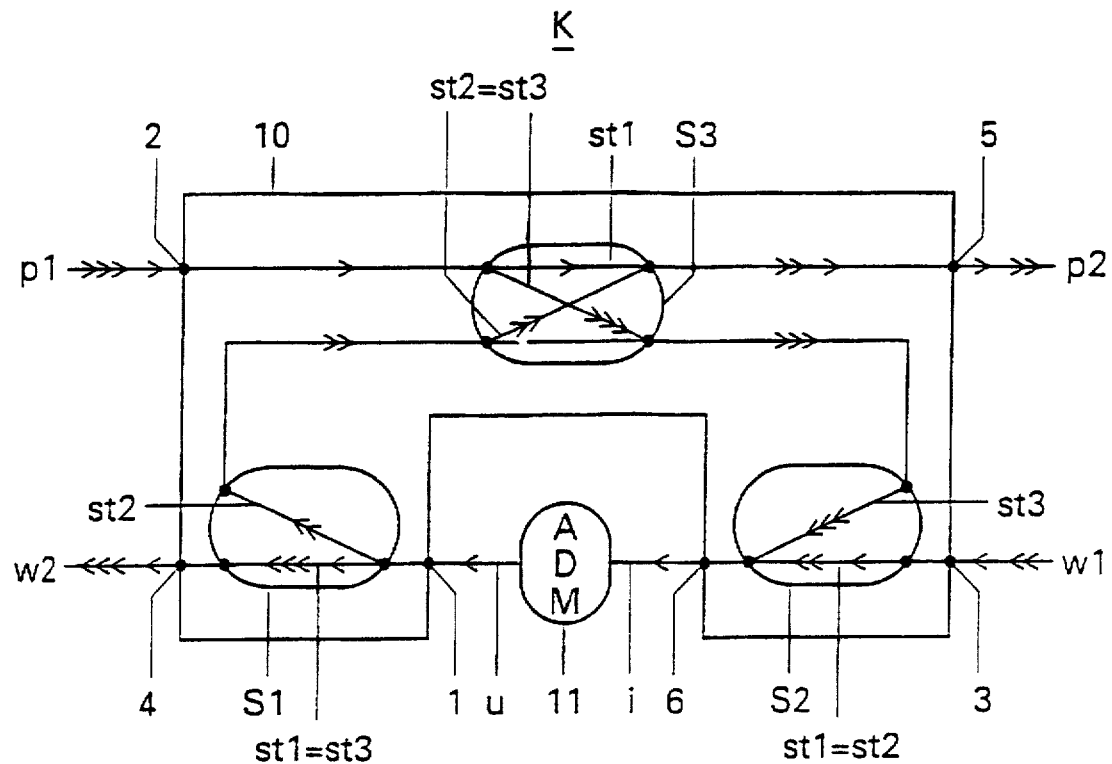
FIG. 1 shows schematically a network node of a self-healing ring-shaped optical network provided with a known optical coupling devive.

References [1] and [2] disclose an optical coupling device which is used as a component in a network node of an optical switching system in a self-healing ring-shaped optical network. FIG. 1 schematically depicts a network node K which is incorporated in a working ring w and a protection ring p of such a network. The network node comprises an add/drop multiplexer 11, hereinafter referred to as ADM, and an optical coupling device 10. The ADM has an input i and an output u. The coupling device 10 has six connection points, numbered 1, 2, 3, 4, 5 and 6. The output u and the input i of the ADM are connected, respectively, to the connection points 1 and 6 of the coupling device 10. Ends w1 and w2 of the working ring w are connected, respectively, to the connection points 3 and 4, whereas ends p1 and p2 of the protection ring p are connected, respectively, to the connection points 2 and 5. The coupling device 10 comprises an optical switching circuit consisting of two 1×2-switches S1 and S2, and a 2×2-switch S3. The coupling device 10 has the switching states:

a first switching state st1 (signal direction in accordance with single arrows), in which the end w1 of the working ring w is through-connected, via switch S2, to the input i of the ADM, the output u of the ADM is through-connected, via switch S1, to the end w2 of the working ring w, and in which the ends p1 and p2 of the protection ring p are directly through-connected to one another via switch S3;

a second switching state st2 (signal direction in accordance with double arrows), in which the end w1 of the working ring w is through-connected, via switch S2, to the input i of the ADM, and the output u of the ADM is through-connected, via switch S1 and switch S3, to the end p2 of the protection ring p, and a third switching state st3 (signal direction in accordance with triple arrows), in which the end p1 of the protection ring p is through-connected via switch S3 and switch S2, to the input i of the ADM and the output u of the ADM is through-connected, via switch S1, to the end w2 of the working ring w.

This known coupling device has the drawback that in the event of a signal transport having to be switched over from the working ring to the protection ring it is always necessary for two of the three switches in the switching circuit to be actuated and turned separately. Hereinafter, a novel type of switch is described. Two of such switches can be combined in such a way that a coupling device is obtained in which the desired switch-overs require only one switch to be actuated, while actuating both switches provides the option of a switching state suitable for testing purposes.

Figures 2A, 2B:
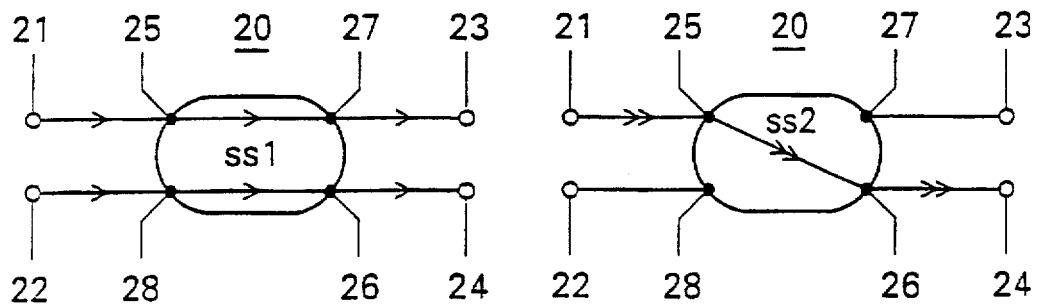
FIGS. 2a–2b functionally show an optical switch according to the invention, in two different switching states.

The optical switch and optical coupling devices based on said optical switch will first be described in a more functional sense. This is followed by an illustration of implementations on some material systems customary in integrated optics. FIGS. 2a and 2b show an optical switch 20 in two different switching states ss1 and ss2, respectively. The switch 20 is provided with four optical connection points 21, 22, 23 and 24. The switch 20 further has a first main port 25 and a second main port 26, coupled, respectively, to the connection points 21 and 24, and a first secondary port 27 and a second secondary port 28, coupled, respectively, to the connection points 22 and 23. In the first switching state ss1, the first main port 25 and the second main port 26 are through-connected optically to, respectively, the first secondary port 27 and the second secondary port 28, in such a way that an optical link exists between the connection points 21 and 23 and between the connection points 22 and 24. In the second switching state ss2, only the first main port 25 and the second main port 26 are through-connected optically to one another, whereas the two secondary ports 27 and 28 are not involved in any through-connection. The switching state ss1 will hereinafter be referred to as a bar state, whereas the switching state ss2 will be referred to as a half-cross state of the switch 20.

Figure 3A:
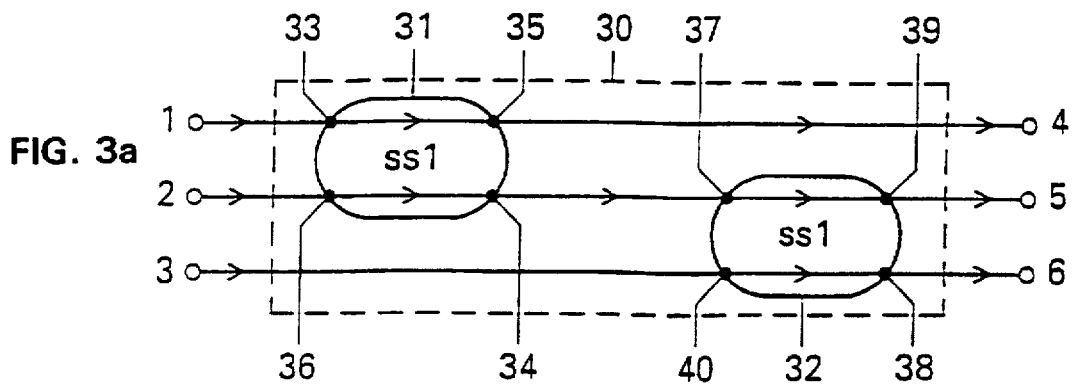
FIGS. 3a–3d schematically show a first version of an optical coupling device according to the invention, in four different switching states.
Figure 3B:
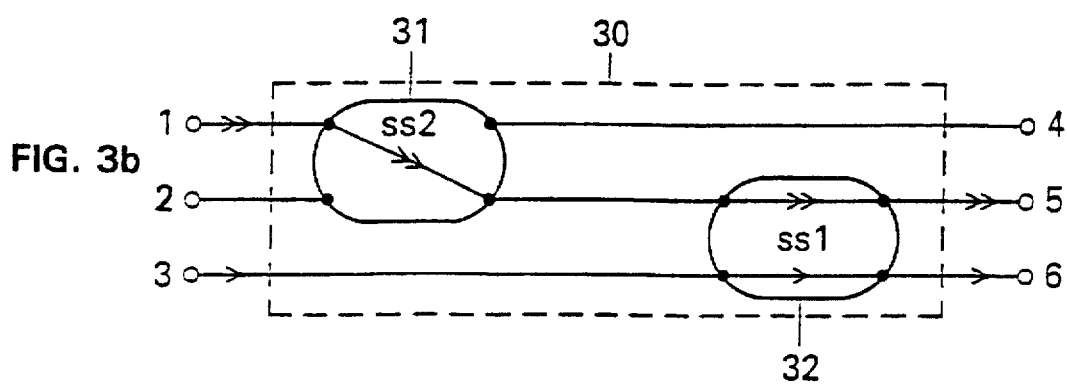
Figure 3C:
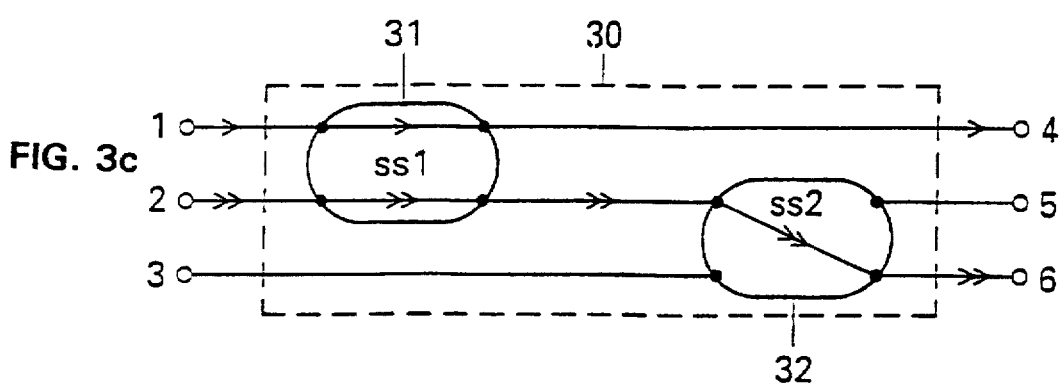
Figure 3D:
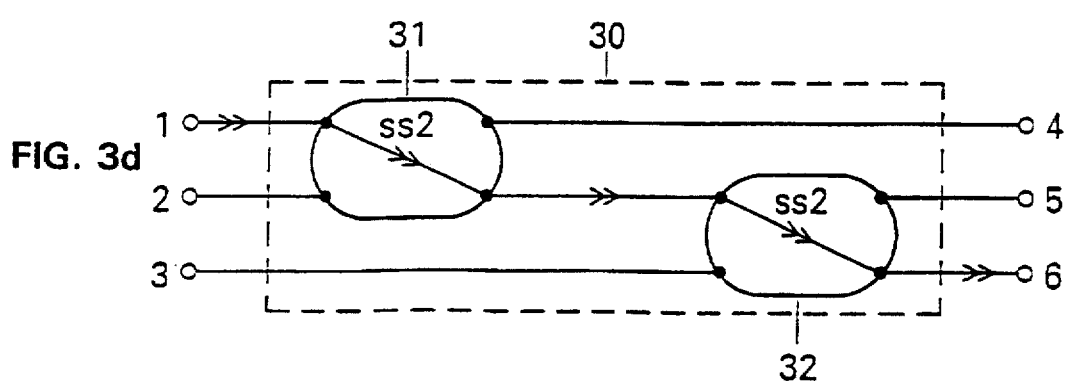

FIGS. 3a–3d schematically show a first version of a coupling device 30 based on two switches 31 and 32 of a type identical to that shown in FIG. 2. Like the known coupling device 10 of FIG. 1, the coupling device has six connection points which are correspondingly numbered 1, - - - , 6. The switch 31 is provided with a first main port 33, a second main port 34, a first secondary port 35 and a second secondary port 36. The switch 32 is provided with a first main port 37, a second main port 38, a first secondary port 39 and a second secondary port 40. The second main port 34 of switch 31 is optically coupled to the first main port 37 of the switch 32. FIG. 3a depicts the coupling device in the switching state st1, which is adopted if the switches 31 and 32 are both in the switching state ss1. FIG. 3b shows the coupling device in the switching state st2 which is adopted if the switches 31 and 32 are in the switching states ss2 and ss1, respectively. FIG. 3c shows the coupling device in the switching state st3 which is adopted if the switches 31 and 32 are in the switching states ss1 and ss2, respectively. FIG. 3d depicts the coupling device in a switching state st4, which is adopted if the switches 31 and 32 are both in the switching state ss2. In this switching state st4, an ADM connected to connection points 1 and 6 will be completely uncoupled both from the working ring w and from the protection ring p.

FIGS. 4a–4d schematically show, in a manner identical to that of FIGS. 3a–3d, a second version of a coupling device 30', based on two switches 31 and 32, the sequential order of the switches 31 and 32 having been interchanged with respect to the way in which they are coupled to one another. This has been achieved by optically coupling the first secondary port 39 of the switch 32 to the second secondary port 36 of the switch 31.

Figure 4A:
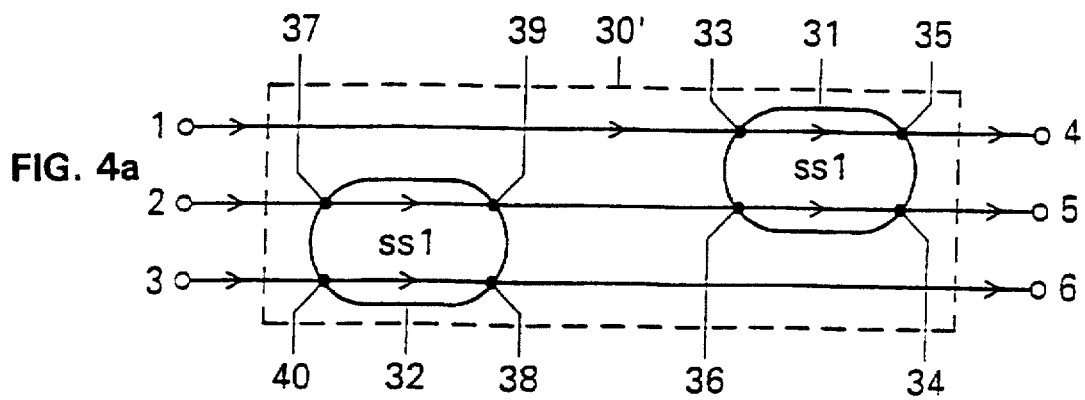
FIGS. 4a–4d schematically show a second version of an optical coupling device according to the invention, in four different switching states.
Figure 4B:
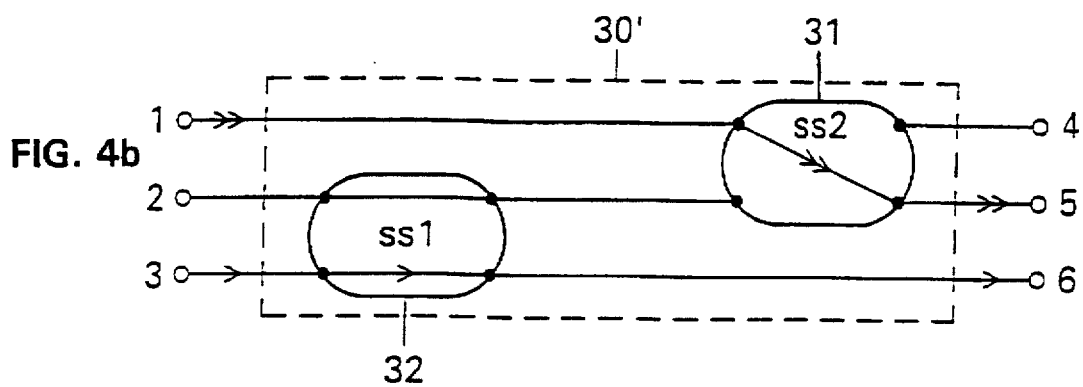
Figure 4C:
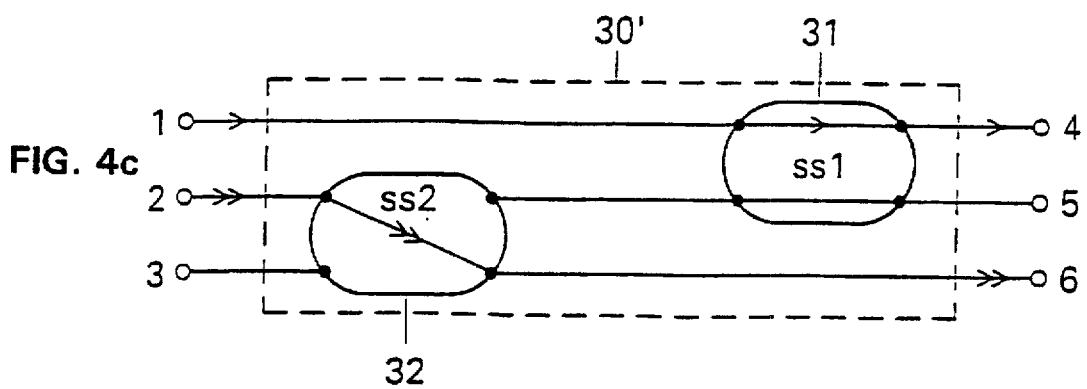

FIG. 4a depicts the coupling device 30' in the switching state st1, which is adopted if the switches 31 and 32 are both in the switching state ss1. FIG. 4b shows the coupling device 30' in the switching state st2 which is adopted if the switches 31 and 32 are in the switching states ss2 and ss1, respectively. FIG. 4c shows the coupling device in the switching state st3 which is adopted if the switches 31 and 32 are in the switching states ss1 and ss2, respectively.

Figure 4D:
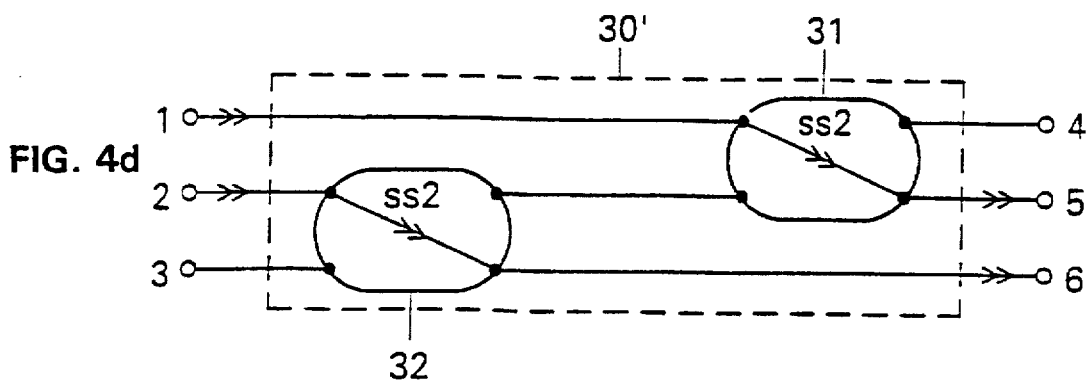

FIG. 4d depicts the coupling device in a switching state st4', which is adopted if the switches 31 and 32 are both in the switching state ss2. In this switching state st4', an ADM connected to connection points 1 and 6 will be completely uncoupled from the working ring w and be incorporated in the protection ring p. Both the switching state st4 of coupling device 30 and the switching state st4' of coupling device 30' can be used for test purposes. Depending on what test situation is required in an operational system, the first or the second version of the coupling device can be used in a network node.

Reference 4 discloses that the behaviour of a waveguide branching in the shape of a Y, hereinafter referred to as Y-junction, can be expressed with the aid of a variable which is referred to as "mode conversion factor" (MCF):

$$MCF \equiv \Delta\beta/(\theta\Gamma)$$

where $\Delta\beta$ is the difference in propagation constant in the two branches of the Y-junction, $\theta$ is the angle between the two branches, and $\Gamma$ is the lateral contrast, i.e. the attenuation constant of the evanescent electromagnetic field accompanying an optical signal in the branching region. The greater the absolute value of this factor, i.e. the greater the asymmetry which exists between the propagation constants in the two branches of the Y-junction, the more effectively the Y-junction will act as a mode splitter. Such a Y-junction acting as a mode splitter will hereinafter be referred to as an asymmetric Y-junction. To achieve mode splitting of at least 20 dB (i.e. less than 1% of a zero-order mode injected into the waveguide ends up in the branch having the lowest propagation constant) the factor has to be greater than 1.5.

Hereinafter, an optical switch is described which is based on two asymmetric Y-junctions which are coupled to one another via one of the branches, and the switching principle of which is described with the aid of FIGS. 2a and 2b.

Figure 5:
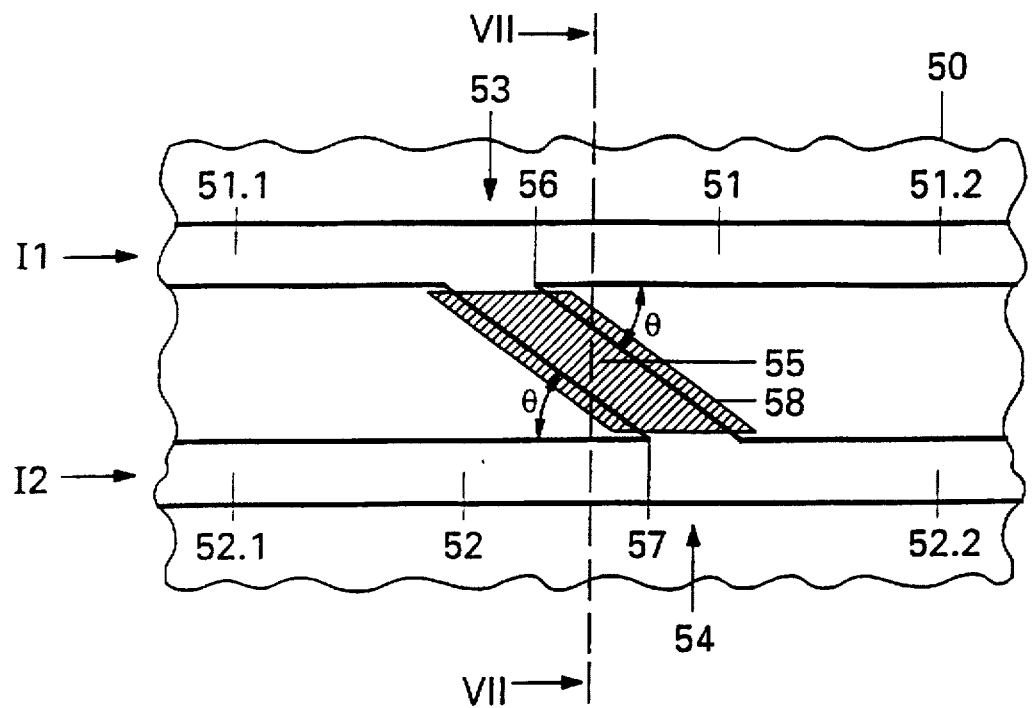
FIG. 5 schematically shows a first version of a waveguide pattern of an optical switch according to the invention in a plan view from above.

FIG. 5 schematically shows, in a plan view from above, a first version of such a switch. On a substrate 50 there is a waveguide pattern which comprises two channel-type waveguides 51 and 52, hereinafter referred to as main channels, outside each other's interaction range. The main channels 51 and 52 have Y-shaped branchings 53 and 54, respectively, which are coupled to one another. In a branching point 56 of branching 53, a channel-type waveguide 55, hereinafter referred to as side channel, branches off from the main channel 51 at a sharp angle θ and, in a branching point 57 of the branching 54, joins the main channel 52, likewise at a sharp angle θ. The Y-shaped branchings 53 and 54 form asymmetric Y-junctions. The main channels preferably, but not necessarily, run parallel. The main channels 51 and 52 and the side channel 55 are single-mode waveguides. The propagation constants in the main channels are essentially equal, but they differ from the propagation constant in the side channel. On or near the side channel 55, switching means 58 are located for varying the propagation constant of the side channel 55. Varying this propagation constant enables two states to be alternately adopted: a first state sp1, in which the propagation constant in the side channel 55 is smaller than the propagation constants in the main channels 51 and 52; and a second state sp2 in which the propagation constant in the side channel 55 is greater than the propagation constants in the main channels 51 and 52. The switch operates as follows: an optical signal $I_1$, which enters at one end 51.1 of the main channel 51, propagates as a zero-order guided mode in the direction of the branching 53. In the branching 53 the optical signal chooses the channel having the highest propagation constant. In the first state sp1, the propagation constant in the main channel 51 is greater than the propagation constant in the side channel 55, and the optical signal propagates further to an end 51.2 of the main channel 51. An optical signal $I_2$ which enters at one end 52.1 of the main channel 52 during the first state sp1 propagates as a zero-order guided mode through the main channel 52 in the direction of a second end 52.2 and in so doing passes the branching 54 unchanged. In the second state sp2, the propagation constant in the side channel 55 is greater than the propagation constant in the main channel 51, and the optical signal $I_1$ propagates onwards through the side channel 53 in the direction of the branching 54, and unchanged via the branching point 57 of the branching 54 to the end 52.2 of the main channel 52. Since in the state sp2 in the branching 54 the propagation constant is greater in the side channel 55, the optical signal $I_2$ is converted, in the branching 54, near the branching point 57, into a first-order guided mode signal. Since the main channel 52 is single-mode, this first-order guided mode signal will, however, past the branching point 57, radiate away from the main channel 52 and will not reach the second end 52.2 of the main channel 52.

Figure 6:
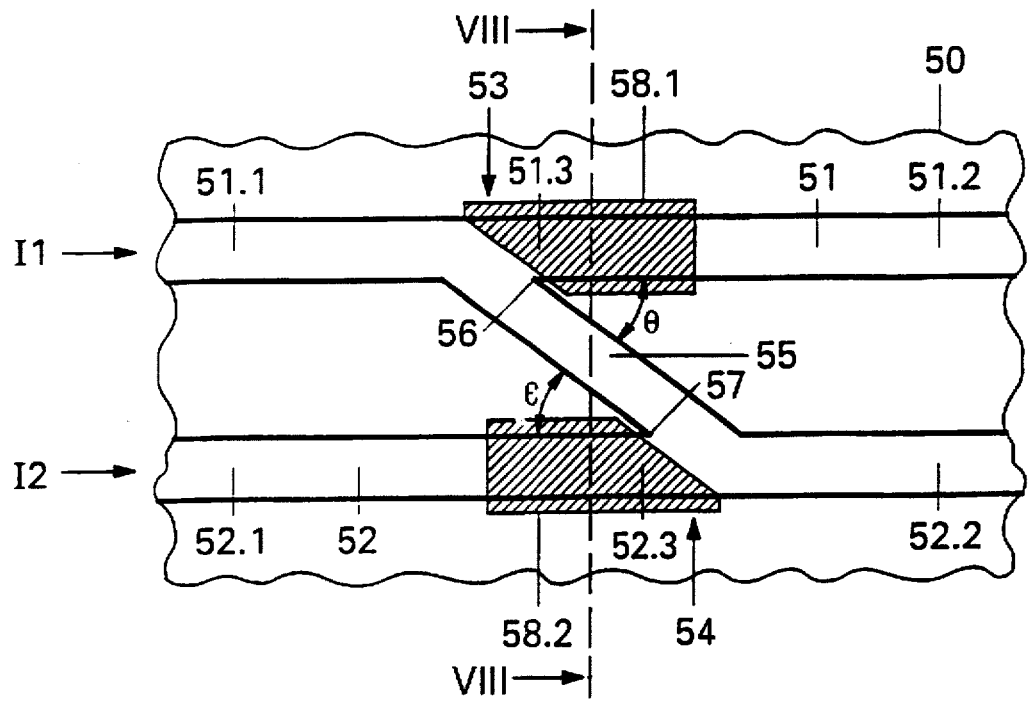
FIG. 6 schematically shows a second version of a waveguide pattern of an optical switch according to the invention in a plan view from above.

The states sp1 and sp2 can likewise be implemented with the aid of coupled switching means 58.1 and 58.2 which locally modulate the propagation constants simultaneously in the main channels 51 and 52, in a portion 51.3 of the main channel 51 downstream of the branching point 56 in the branching 53, and in a portion 52.3 of the main channel 52 upstream of the branching point 57 in the branching 54, respectively. This is shown in FIG. 6.

How the switching means are chosen depends on the material of the system in which the waveguide pattern of the switch is implemented.

Thus it is possible to make use of a modulation of the refractive index and thus of the propagation constant by means of electro-optical, thermo-optical, etc. effects. The magnitude and sign of any propagation constant change induced by the switching means must be such that the MCF in the two states sp1 and sp2 has about the same absolute value, but opposite signs. The absolute value of the change must therefore be about $2\Delta\beta$. Only in that case will the two branchings in both states continue to work as asymmetric Y-junctions having an identical splitting ratio. Additionally, for a given material system and switching means tailored thereto, the position of the switching means and the propagation constants in the main channels and the side channel are preferably chosen in such a way that in the case of switching means which have not been energized, the optical switch adopts the state sp1. This means that in the version of FIG. 5, in the passive state, the effective refractive index of the side channel 55 is smaller than the effective refractive indices of at least the portions 51.3 and 52.3 of the main channels, and the switching means have to induce an increase in the refractive index in the side channel 55. In the version of FIG. 6, what the switching means have to induce is a reduction in the refractive index.

In a system using a semiconductor material such as indium phosphide (InP), both options are present. The electro-optical effect can be used to achieve an increase in the refractive index, whereas what is effected by injection of charge carriers is a reduction in the refractive index. Employing such a material for the system makes it possible to implement the entire waveguide structure of the switch by means of an identical type of ridge-type waveguide.

Figure 7:
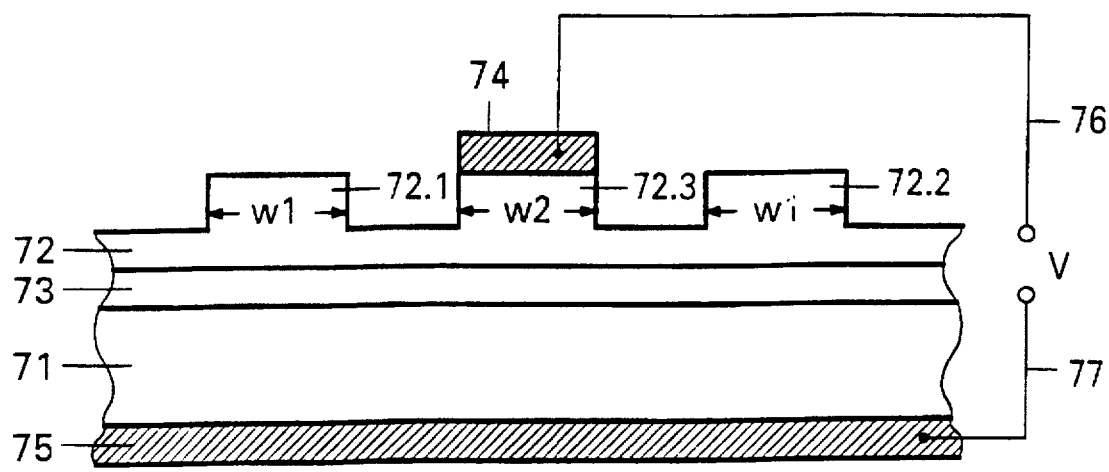
FIG. 7 schematically shows a cross-sectional view of a waveguide pattern shown in FIG. 5 on VII—VII.

FIG. 7 schematically shows a cross-sectional view of the switch as shown in FIG. 5 on VII—VII, based on indium phosphide, in which use is made of the electro-optical effect. Between a substrate 71 and a top layer 72, both made of InP, there is a light-guiding layer 73, made of InGaAsP and having a thickness t. The top layer 72 has local ridge-type elevations 72.1, 72.2 and 72.3 to define, respectively, the main channels 51 and 52 and the side channel 55. The ridge-type elevations 72.1 and 72.2 have a width ridge-type elevation $w_1$ and the 72.3 has a width $w_2<w_1$. A first electrode 74 is disposed above the ridge-type elevation 72.3 which defines the side channel 55. A second electrode 75 is disposed (by way of example as a sheet electrode) on the underside of the substrate 71, below the ridge-type elevation 72.3. A variable voltage source can be connected, via leads 76 and 77, to the electrodes 74 and 75, to supply a voltage V for variably generating an electric field between the electrodes, resulting in a variable increase of the refractive index being effected in the side channel 55 defined by the ridge-type elevation 72.3. The electrode 74 need not extend over the entire length of the side channel 55, and may comprise two electrically connected portions which extend from the branching points 56 and 57.

Figure 8:
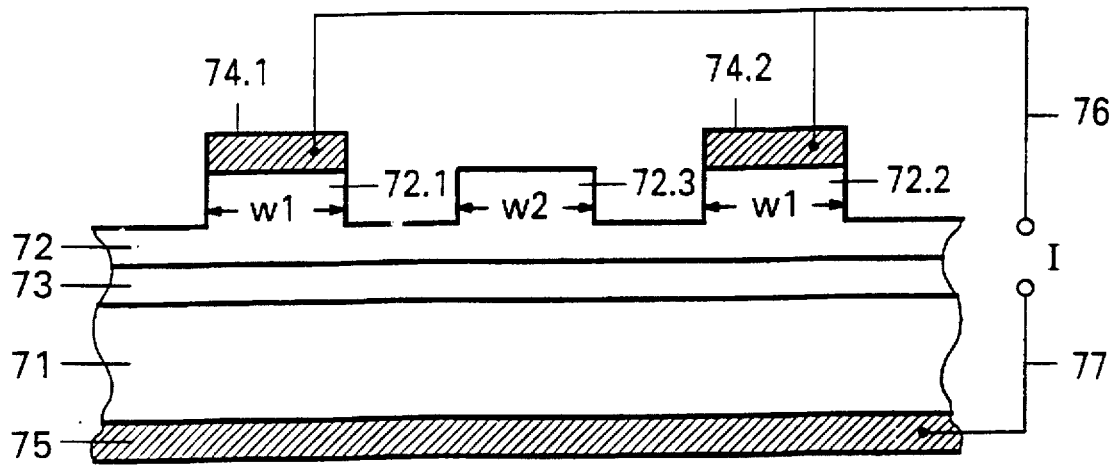
FIG. 8 schematically shows a cross-sectional view of a waveguide pattern shown in FIG. 6 on VIII—VIII.

In a manner similar to FIG. 7, FIG. 8 shows a cross-sectional view of the switch as shown in FIG. 6 on VIII—VIII, based on indium phosphide, in which use is made of charge carrier injection. Now, the first electrode 74 comprises two electrically coupled portions 74.1 and 74.2. A variable current source I can be connected, via leads 76 and 77, to the electrodes 74 and 75, to supply a current, by means of which charge carrying injection can be effected in the top layer 72 at the location of the ridge-type elevations 72.1 and 72.2, which results in a reduction in the refractive index in the portions 51.3 and 52.3, defined by the ridge-type elevations, of the main channels 51 and 52.

An implementation of the switch according to FIG. 7 has the advantage that the first electrode can be formed from only one part. Implementation according to FIG. 8 has the advantage that a change in the refractive index due to charge carrying injection is much larger than that due to the electro-optical effect. As a result, the angle θ can be chosen to be much larger, relatively, and the length of the switch may consequently be much more restricted.

To implement the coupling devices which have been functionally described with reference to FIGS. 3a–3d and FIGS. 4a–4d, the waveguide patterns of two switches Sw(1) and Sw(2) in accordance with FIG. 5 or FIG. 6 are coupled to one another in such a way that one of the main channels of one switch is in line with the other switch. There are two options which are shown, respectively, in FIGS. 9a–9b. A dividing line Z1 (broken line) distinguishes the waveguide patterns of the switch Sw(1) and the switch Sw(2). Components of the waveguide patterns have the same numerals as corresponding components in FIG. 5, supplemented with an indication (1) or (2) which refers, respectively, to the switch Sw(1) or Sw(2) in question. The ends of the main channels are numbered in accordance with the six connection points 1, - - - , 6 of the coupling devices. A first option is that in which the end 51.1 of the first main channel 51 of the switch Sw(2) is directly joined to the end 52.2 of the second main channel 52 of the switch Sw(1). This option, depicted in FIG. 9a, implements the coupling device of FIGS. 3a–3d. The second option is that in which the end 52.1 of the second main channel 51 of the switch Sw(1) is directly joined to the end 51.2 of the first main channel 51 of the second switch Sw(2). This option, depicted in FIG. 9b, implements the coupling device of FIGS. 4a–4d.

For the optical switch, a second version is possible for the waveguide pattern, in which switching means in the side channel can be used, which bring about a reduction in the refractive index. This second version is based on some guiding characteristics which are specific for an asymmetric Y-junction having a bimodal trunk.

Figure 10:
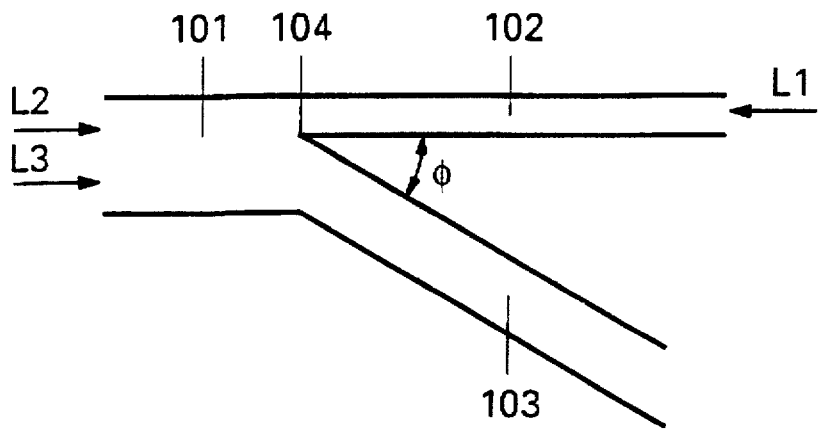
FIG. 10 schematically shows a waveguide pattern of an asymmetric Y-junction.

FIG. 10 schematically depicts a waveguide pattern of such an asymmetric Y-junction. This Y-junction has a bimodal trunk 101, a narrow monomodal branch 102 and a wide monomodal branch 103, a branching point 104 and a branching angle φ. It should be noted that the adjectives "narrow" and "wide" are used symbolically for a lower and higher propagation constant of the branches. Such a Y-junction behaves as follows. An optical signal L1 which propagates in the narrow branch 102 in accordance with a zeroth-order guided mode in the direction of the branching point 104, propagates onwards in the bimodal trunk 101 in accordance with a first-order guided mode. Conversely, an optical signal L2 which propagates in the bimodal branch 101, in accordance with a first-order guided mode in the direction of the branching point 104, will propagate onwards in accordance with a zero-order guided mode in the narrow branch 102, whereas an optical signal L3 which propagates in the bimodal branch 101 in accordance with a zero-order mode will, on the other hand, propagate onwards in the wide branch 103. For the signals L1 and L2, such a Y-junction therefore acts as a mode converter, whereas the Y-junction acts as a mode splitter for the signals L2 and L3.

Figure 11:
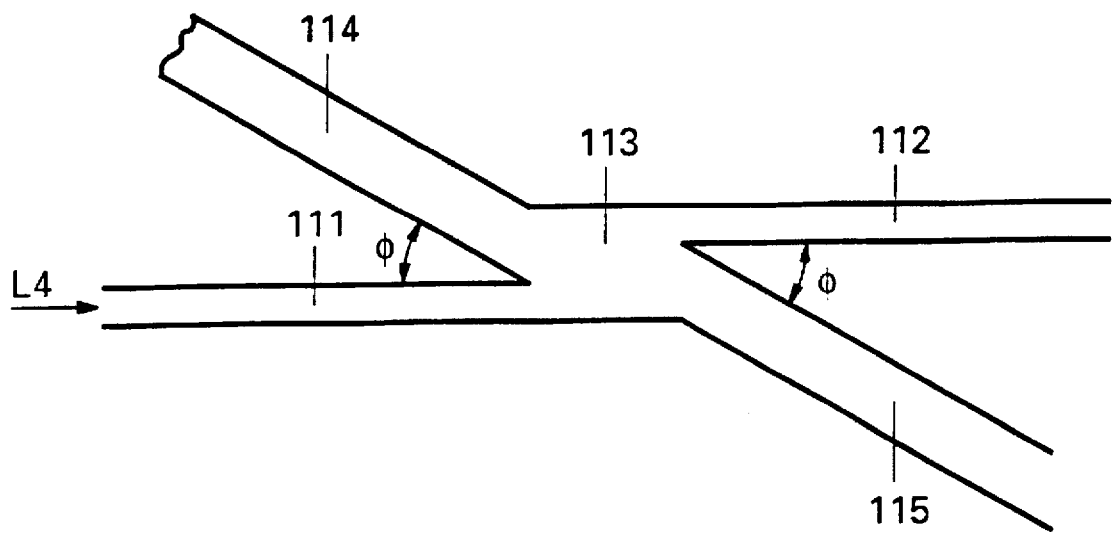
FIG. 11 schematically shows a waveguide pattern of an asymmetric X-junction.
Figure 12:
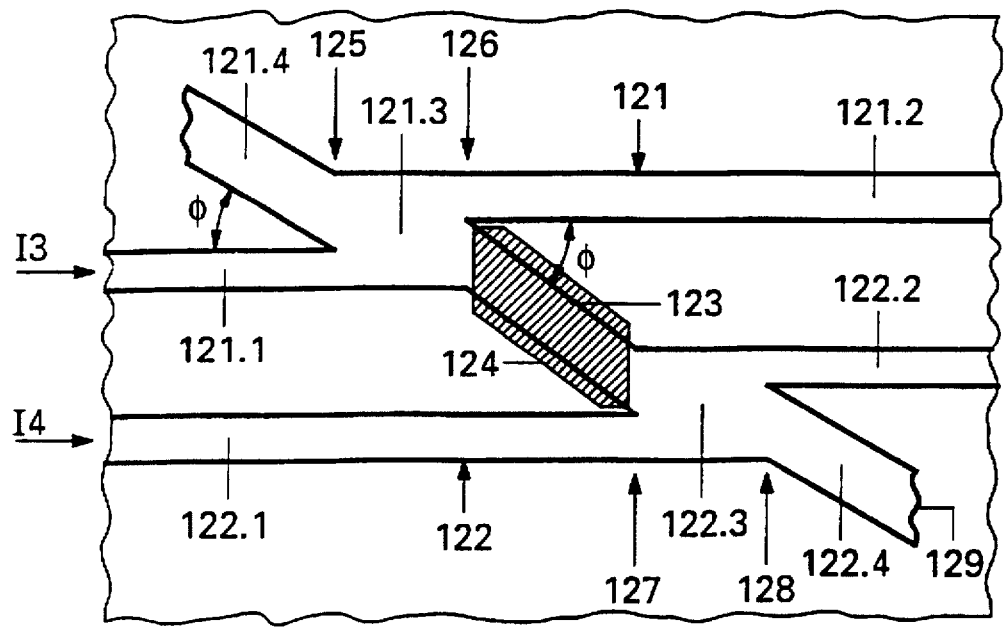
FIG. 12 schematically shows a third version of a waveguide pattern of an optical switch according to the invention in a plan view from above.

If two such asymmetric Y-junctions are coupled "back-to-back" by their bimodal trunks, a doubly-asymmetric X-junction is obtained. The waveguide pattern of such an X-junction, depicted schematically in FIG. 11, consists of two wave-guiding channels which cross one another, i.e. a first channel formed by two narrow branches 111 and 112, which are coupled to one another via a bimodal trunk 113, and a second channel formed by two wide branches 114 and 115, which are likewise coupled to one another via the bimodal trunk 113. An optical signal L4 injected into the one narrow branch 111 will propagate onwards past the bimodal trunk via the other narrow branch 112. If, however, the propagation constant in the wide branch 115 is lowered (artificially) to below the propagation constant of the narrow branch 112, the signal will propagate onwards via the wide branch 115. It should be noted in this context that the same effect can be achieved by a corresponding increase in the propagation constant in the narrow branch 112. Such an X-junction is used as a Y-shaped branching in the waveguide pattern of FIG. 5 instead of each of the branchings 53 and 54. One of the wide branches, in this case the branch 114, is not used. Such an unused branch is also referred to as dummy branch. FIG. 12 shows the second version of a waveguide pattern for the switch. This waveguide pattern comprises a first main channel 121 having monomodal ends 121.1 and 121.2 and a bimodal intermediary piece 121.3, and a second main channel 122 having monomodal ends 122.1 and 122.2 and a bimodal intermediary piece 122.3. The main channels 121 and 122 are coupled, from the bimodal intermediary pieces 121.3 and 122.3, via a side channel 123 which encloses an acute angle φ with each of the main channels. On or near the side channel 123, switching means 124 are disposed for lowering the propagation constant in the side channel. The main channels 121 and 122 have dummy side branches 121.4 and 122.4, respectively. Compared with the first version, which is composed of two coupled Y-shaped branchings having a monomodal trunk, this second version is composed of four Y-shaped branchings having a bimodal trunk. A first Y-shaped branching 125 is formed by the monomodal end 121.1, the bimodal intermediary piece 121.3 and the dummy side branch 121.4; a second Y-shaped branching 126 is formed by the bimodal intermediary piece 121.3, the monomodal end 121.2 and the side channel 123; a third Y-shaped branch is formed by the monomodal end 122.1, the bimodal intermediary piece 122.3 and the side channel 123; and a fourth Y-shaped branching, finally, by the bimodal intermediary piece 122.3, the monomodal end 122.2 and the dummy side branch 122.4. This second version has precisely the same switching function as the first version. Additionally, however, this second version has a special property if the switch is in a state in which the propagation constant in the side channel 123 has been lowered. In that case, a signal $I_3$ injected into the end 121.1 of the main channel 121 propagates via the intermediary pieces 121.3 and 122.3 and the side channel 123 situated therebetween, and exits via the end 122.2 of the main channel 122. A signal $I_4$ injected simultaneously into the end 122.1 of the second main channel 122 then propagates onwards via the intermediary piece 122.3 through the dummy branch 122.4 from which the signal $I_4$ will be emitted at an end 129. To prevent any troublesome effect of emitted signals, such a dummy branch is preferably extended, for example to an edge of the chip on which the switching pattern has been implemented.

Figure 9A:
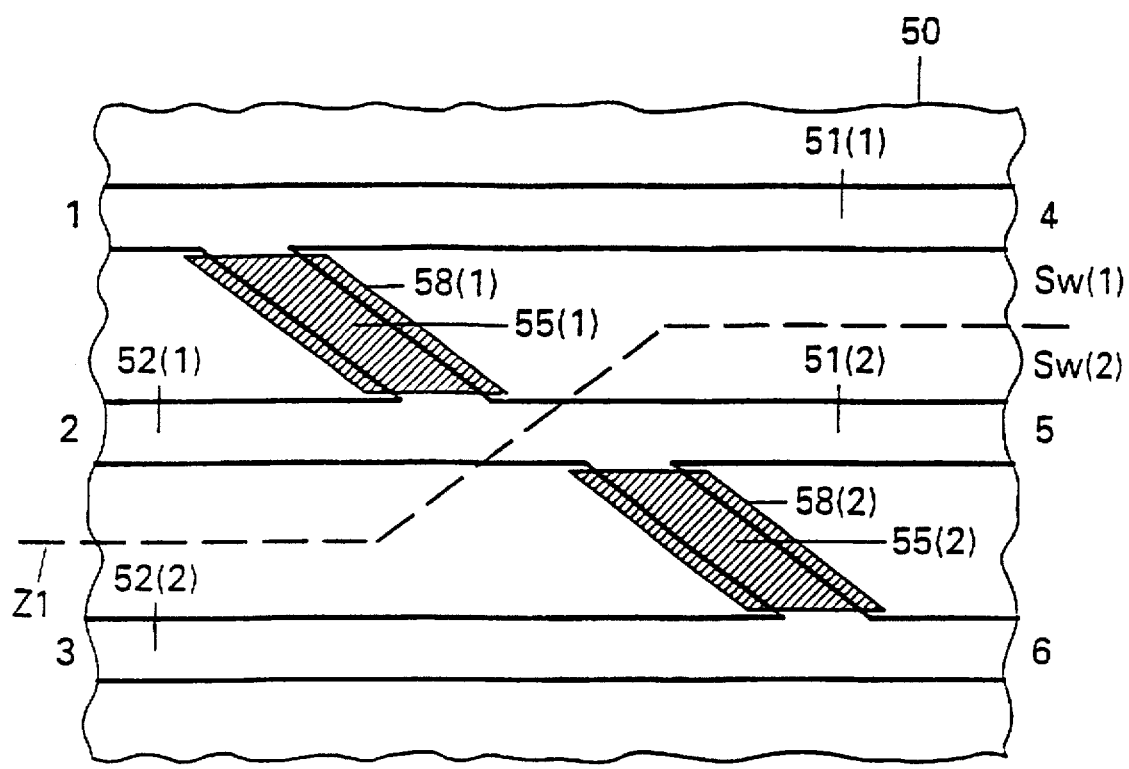
FIGS. 9a–9b schematically show versions of an optical coupling device according to the invention, said device being based on the waveguide pattern shown in FIG. 5.
Figure 9B:
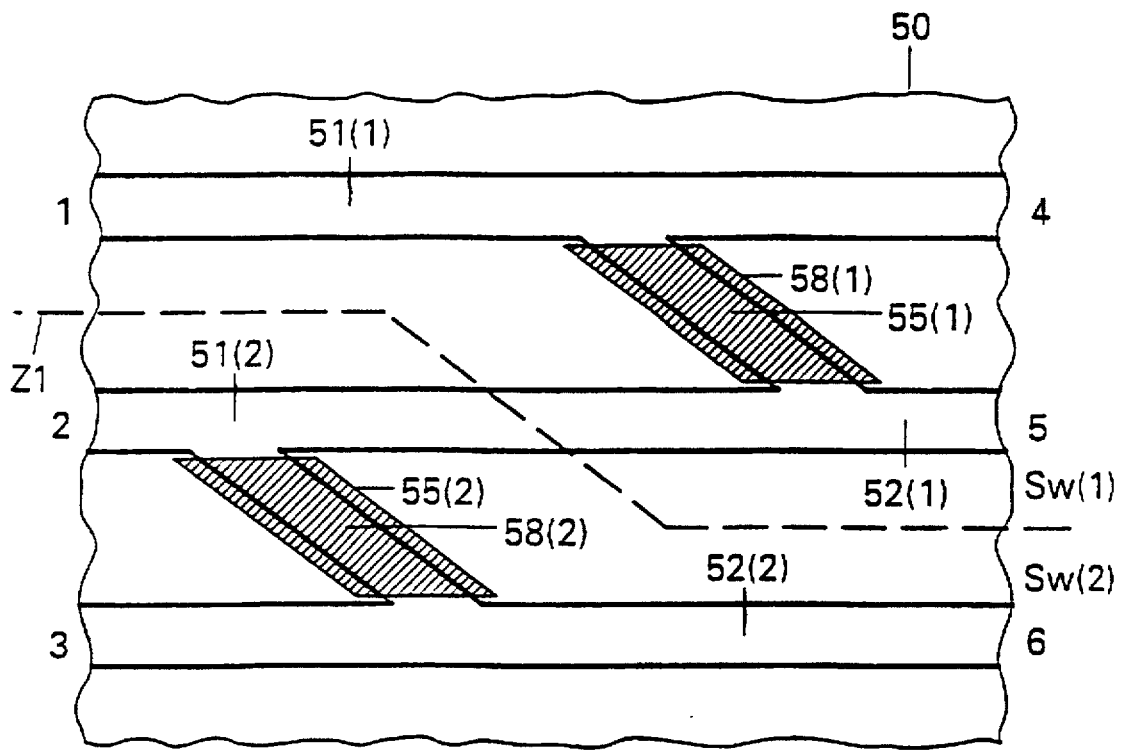

As a result of two waveguide patterns in accordance with the second version being coupled to one another in a manner similar to that depicted for the first version in FIGS. 9a and 9b, coupling devices are again obtained which have the switching functions in accordance with FIGS. 3a–3d and FIGS. 4a–4d, respectively.

With respect to the coupling device which corresponds to that of FIG. 9a, a further version is possible, however, which in terms of length is shorter by about a third.

Figure 13:
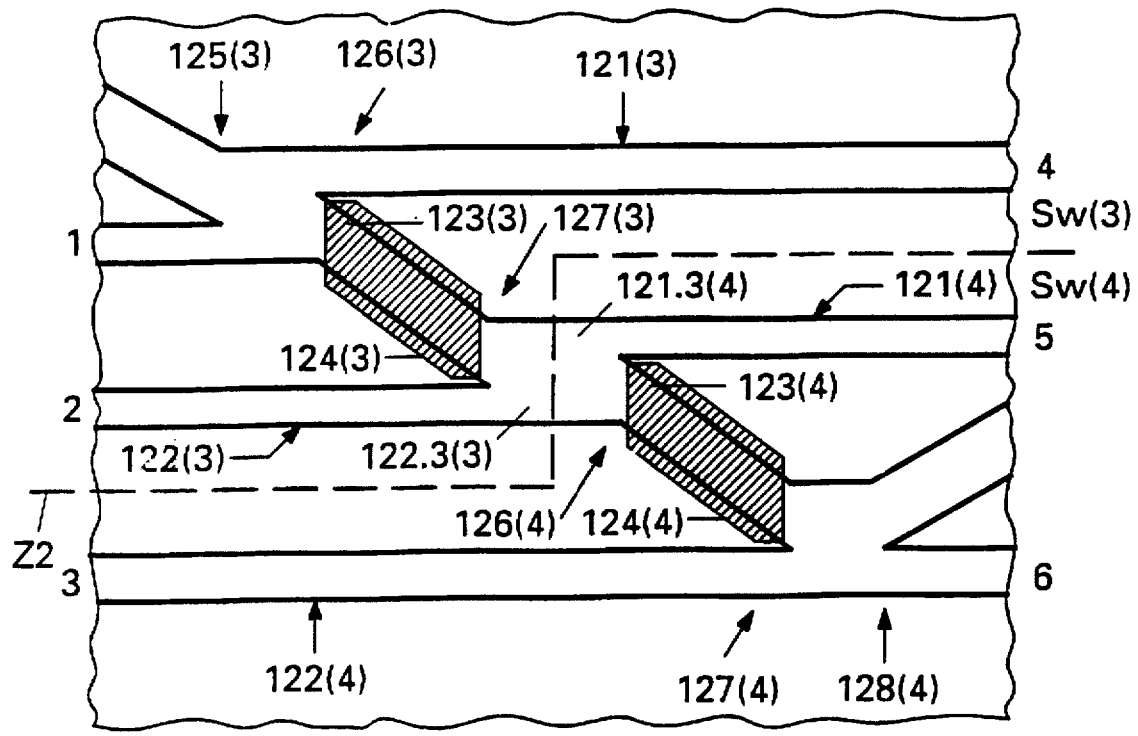
FIG. 13 schematically shows a third version, based on an optical switch according to FIG. 12, of the optical coupling device according to the invention.

This version is depicted in FIG. 13. A dividing line Z2 (broken line) distinguishes the waveguide patterns of a switch Sw(3) and a switch Sw(4). Components of the waveguide patterns have the same numerals as corresponding components in FIG. 12, supplemented by an indication (3) or (4) which respectively refers to the switch Sw(3) or Sw(4) in question. The ends of the main channels are numbered in accordance with the six connection points 1, - - - , 6 of the coupling devices. The switching patterns of the switches Sw(3) and Sw(4) are now not coupled via an end of a main channel of each switch. In this version, the patterns are coupled in such a way that the bimodal intermediary piece 122.3(3) of the main channel 122(3) of the switch Sw(3) merges directly into the bimodal intermediary piece 121.3(4) of the main channel 121(4) of the switch Sw(4). Such a coupling is possible in view of the fact that the second branching 126(4) of the switch Sw(4) assumes the function which a fourth branching 128(3) would have to have for the third switch Sw(3), whereas the third branching 127(3) of the switch Sw(3) assumes the function which a first branching 125(4) would have to have for the switch Sw(4). Such a fourth branching for switch Sw(3) and such a first branching for switch Sw(4) are therefore superfluous, and this version for the coupling device is therefore considerably shorter than twice the length of the switch used and has two dummy branches fewer. This version further has the special feature that if the switching means in both side channels 123(3) and 123(4) have been energized and an optical signal injected at the connection point 1 is therefore guided to the connection point 6, a signal injected at the same time at connection point 2 is guided to the connection point 5. This means that in that state the optical link between the connection points 2 and 5 remains intact, in contrast to the coupling device in accordance with FIG. 9a.

With reference to FIG. 7 and FIG. 8, two implementations of the optical half-cross/bar switch on indium phosphide has already been described. Another suitable material is lithium niobate, given the large electro-optical effects, the good quality of waveguides therein, and the low coupling losses with glass fibres. By means of a suitable choice of the crystal orientation of a substrate of lithium niobate, of the direction of the waveguides thereon, and of the polarity of an electric field to be applied to change the refractive index, an increase in the refractive index is possible for both polarizations simultaneously. Thus a switch in accordance with FIG. 5 and coupling devices in accordance with the FIGS. 9a–9b can be implemented. Here too, just as in the case of the digital optical switch disclosed by in Reference 3, switches are possible with split angles of 1–3 mrad (0.06–0.17 degrees), a switching voltage of a few tens of volts, and a cross-talk better than 20 dB. This makes the coupling devices approximately 2 cm long. Other attractive materials for implementing the switches and the coupling devices are polable glassy organic polymers. Waveguides are readily implemented in thin layers of such a material. In the poled state these materials have relatively large electro-optical effects. Furthermore, these materials exhibit a thermo-optical effect which is much larger than the electro-optical effect. An increase in temperature is accompanied by a reduction in the refractive index, so that the versions shown in FIG. 6 and FIG. 12 are preferred options for the switches. This large effect makes it possible to implement the switches with split angles in the order of one degree, so that the length can remain as small as a few millimeters, while switching requires only a few milliwatts.

We claim:

1. An optical coupling device provided with six connection points, numbered from one to six inclusive, each for connecting an optical link, and with switching means for implementing optical through-couplings between the six connection points, wherein the switching means comprises three switching states:

(i) a first switching state in which through-couplings exist between the first and the fourth connection point, between the second and the fifth connection point and between the third and the sixth connection point;

(ii) a second switching state in which through-couplings exist between the first and the fifth connection point and between the third and the sixth connection point; and (iii) a third switching state in which through-couplings exist between the first and the fourth connection point and between the second and the sixth connection point, wherein the switching means comprises a first switch and a second switch each provided with a first main port, a second main port, a first secondary port and a second secondary port, the first main port and the first secondary port of the first switch respectively being coupled to the first and the fourth connection point, and the first main port and the first secondary port of the second switch respectively being coupled to the sixth and the third connection point, wherein each of the first and second switches has two switching substates:

(i) a first switching substate in which the first main port and the second main port are coupled through to the first secondary port and the second secondary port, respectively; and (ii) a second switching substate in which the first main port is coupled through to the second main port, with the first secondary port and the second secondary port having no involvement in through-coupling, wherein the first switching state corresponds to the first switching substate of the first and the second switches, the second switching state corresponds to the second switching substate of the first switch and the first switching substate of the second switch, and the third switching state corresponds to the first switching substate of the first switch and the second switching substate of the second switch.

2. The coupling device according to claim 1, wherein the second secondary port of the first switch and the second secondary port of the second switch are coupled, respectively, to the second and the fifth connection point, and the second main port of the first switch is coupled to the second main port of the second switch; and wherein the switching means has a fourth switching state in which: (i) through-coupling exists between the first and the sixth connection point; (ii) the second, the third, the fourth and the fifth connection point have no involvement in through-coupling; and (iii) the first and the second switch are both in the second switching substate.

3. The coupling device according to claim 1, wherein the second main port of the first switch and the second main port of the second switch are coupled, respectively, to the fifth and the second connection point, and the second secondary port of the first switch is coupled to the second secondary port of the second switch; and wherein the switching means has a fourth switching state in which: (i) through-coupling exists between the first and the fifth connection point and between the second and the sixth connection point; (ii) the third and the fourth connection point have no involvement in through-coupling; and (iii) the first and the second switch are both in the second switching substate.

4. An optical coupling device provided with six connection points, numbered from one to six inclusive, each for connecting an optical link, and with switching means for implementing optical through-couplings between the six connection points;

wherein the switching means comprises a substrate and two optical switches formed thereon, each of said optical switches including:
  (i) an input section provided with a first optical input guide and a second optical input guide;
  (ii) an output section provided with a first optical output guide and a second optical output guide; and
  (iii) an optical switching section including:
    (a) a first asymmetric Y junction provided with a first optical wave-guiding trunk and a first and a second optical wave-guiding branch, the trunk and the first branch of the first Y-junction being coupled, respectively, to the first input guide and the first output guide;
    (b) a second asymmetric Y-junction provided with an optical wave-guiding trunk and a first and a second optical wave-guiding branch, the trunk and the first branch of said second Y-junction respectively being coupled to the second output guide and the second input guide, and the second branch being coupled to the second branch of the first Y-junction; and
    (c) means for varying the optical propagation state in the two branches, coupled to one another, of the two Y-junctions;

wherein the first input guide and the first output guide of the first switch are coupled, respectively, to the first and the fourth connection point, and the second input guide and the second output guide of the second switch are coupled, respectively, to the third and the sixth connection point.

5. The coupling device according to claim 4, wherein the second input guide of the first switch is coupled to the second connection point, the first output guide of the second switch is coupled to the fifth connection point, and the second output guide of the first switch is coupled to the first input guide of the second switch.

6. The coupling device according to claim 5, wherein the first input guide of the second switch is coupled to the second connection point, the second output guide of the first switch is coupled to the fifth connection point, and the first output guide of the second switch is coupled to the second input guide of the first switch.

7. An integrated optical switch comprising:
  (i) an input section provided with a first optical input guide and a second optical input guide;
  (ii) an output section provided with a first optical output guide and a second optical output guide; and
  (iii) an optical switching section including:
    a first asymmetric Y-junction having a mode splitting function, said first asymmetric Y-junction comprising a first optical wave-guiding trunk and a first and a second optical wave-guiding branch, the trunk and the first branch of the first Y-junction being coupled, respectively, to the first input guide and the first output guide;
    a second asymmetric Y-junction having a mode splitting function, said second asymmetric Y-junction comprising an optical wave-guiding trunk and a first and a second optical wave-guiding branch, the trunk and the first branch of said second Y-junction respectively being coupled to the second output guide and the second input guide, and the second branch being coupled to the second branch of the first Y-junction; and
    means for varying the optical propagation state in the two branches, coupled to one another, of the first and second Y-junctions.

8. The switch according to claim 7, wherein:
  (i) the input section is further provided with a third optical input guide;
  (ii) the output section is further provided with a third optical output guide; and
  (iii) the optical switching section further includes:
    a third asymmetric Y junction having a mode splitting function, said third asymmetric Y-junction comprising an optical wave-guiding trunk and a first and a second optical wave-guiding branch;
    a fourth asymmetric Y-junction having a mode splitting function, said fourth asymmetric Y-junction comprising an optical wave-guiding trunk and a first and a second optical wave-guiding branch, the trunk and the first branch of said fourth Y-junction respectively being coupled to the third output guide and the third input guide, and the second branch being coupled to the second branch of the third Y-junction; and
    further means for varying the optical propagation state in the two branches, coupled to one another, of the third and the fourth Y-junctions.

9. The switch according to claim 8, wherein the first branch of the third Y-junction coincides with the first branch of the second Y-junction, and wherein the first branches are coupled, on the one hand, via the trunk of the second Y-junction to the second output guide and, on the other hand, via the trunk of the third Y-junction to the second input guide.

10. The switch according to claim 9, wherein the trunk of the third Y-junction coincides with the trunk of the second Y-junction, and wherein the trunks are coupled, on the one hand, via the first branch of the third Y-junction to the second output guide and, on the other hand, via the first branch of the second Y-junction to the second input guide.

11. The switch according to claims 7, wherein:
  the input guides and the output guides and the Y-junctions are formed from monomodal waveguides;
  the second branch of each Y-junction has a propagation constant lower than a propagation constant of the first branch of the same Y-junction; and
  said means and said further means effect a variable increase in the propagation constant in the second branches of the Y-junctions to a level above the propagation constant in the first branches of the Y-junctions.

12. The switch according to claim 7, wherein:
  the input guides, the output guides and the first and second branches of the said Y-junctions are formed from monomodal waveguides and the trunks of the said Y-junctions are formed from bimodal waveguides;
  the second branch of each Y-junction has a higher propagation constant than a propagation constant of the first branch of the same Y-junction;
  said means and said further means effect a variable decrease of the propagation constant in the second branches of the Y-junctions to a level below the propagation constant in the first branches of the Y-junctions; and a dummy asymmetric Y-junction is incorporated between a bimodal trunk which is coupled to one of the monomodal input and output guides, said dummy asymmetric Y-junction comprising two branches, one of which forms one of said input and output guides.

13. The switch according to claims 8, wherein:

the input guides and the output guides and the Y-junctions are formed from monomodal waveguides;

the second branch of each Y-junction has a lower propagation constant than a propagation constant of the first branch of the same Y-junction; and said means and said further means effect a variable increase in the propagation constant in the second branches of the Y-junctions to a level above the propagation constant in the first branches of the Y-junctions.

14. The switch according to claim 8, wherein:

the input guides, the output guides and the first and second branches of the said Y-junctions are formed from monomodal waveguides and the trunks of the said Y-junctions are formed from bimodal waveguides;

the second branch of each Y-junction has a higher propagation constant than a propagation constant of the first branch of the same Y-junction;

said means and said further means effect a variable decrease of the propagation constant in the second branches of the Y-junctions to a level below the propagation constant in the first branches of the Y-junctions; and a dummy asymmetric Y-junction is incorporated between a bimodal trunk which is coupled to one of the monomodal input and output guides, said dummy asymmetric Y-junction comprising two branches, one of which forms one of the input and output guides.

15. The switch according to claim 9, wherein:

the input guides and the output guides and the Y-junctions are formed from monomodal waveguides;

the second branch of each Y-junction has a lower propagation constant than a propagation constant of a first branch of the same Y-junction; and said means and said further means effect a variable increase in the propagation constant in the second branches of the Y-junctions to a level above the propagation constant in the first branches of the Y-junctions.

16. The switch according to claim 9, wherein:

the input guides, the output guides and the first and second branches of the said Y-junctions are formed from monomodal waveguides and the trunks of the said Y-junctions are formed from bimodal waveguides;

the second branch of each Y-junction has a higher propagation constant than a propagation constant of the first branch of the same Y-junction;

said means and said further means effect a variable decrease of the propagation constant in the second branches of the Y-junctions to a level below the propagation constant in the first branches of the Y-junctions; and a dummy asymmetric Y-junction is incorporated between a bimodal trunk which is coupled to one of the monomodal input and output guides, said dummy asymmetric Y-junction comprising two branches, one of which forms one of the input and output guides.

17. The switch according to claim 10, wherein:

the input guides and the output guides and the Y-junctions are formed from monomodal waveguides;

the second branch of each Y-junction has a lower propagation constant than a propagation constant of the first branch of the same Y-junction; and said means and said further means effect a variable increase in the propagation constant in the second branches of the Y-junctions to a level above the propagation constant in the first branches of the Y-junctions.

18. The switch according to claim 10, wherein:

the input guides, the output guides and the first and second branches of the said Y-junctions are formed from monomodal waveguides and the trunks of the said Y-junctions are formed from bimodal waveguides;

the second branch of each Y-junction has a higher propagation constant than a propagation constant of the first branch of the same Y-junction;

said means and said further means effect a variable decrease of the propagation constant in the second branches of the Y-junctions to a level below the propagation constant in the first branches of the Y-junctions; and a dummy asymmetric Y-junction is incorporated between a bimodal trunk which is coupled to one of the monomodal input and output guides, said dummy asymmetric Y-junction comprising two branches, one of which forms one of the input and output guides.

* * * * *